United States Patent [19]

Bills et al.

[11] Patent Number: 5,296,817

[45] Date of Patent: Mar. 22, 1994

[54] IONIZATION GAUGE AND METHOD OF USING AND CALIBRATING SAME

[75] Inventors: Daniel G. Bills, Boulder; Michael D. Borenstein, Louisville; Paul C. Arnold, Boulder, all of Colo.

[73] Assignee: Granville-Phillips Company, Boulder, Colo.

[21] Appl. No.: 906,665

[22] Filed: Jun. 30, 1992

Related U.S. Application Data

[63] Continuation-in-part of Ser. No. 778,371, Oct. 17, 1991, and a continuation-in-part of Ser. No. 507,579, Apr. 11, 1990, Pat. No. 5,128,617.

[51] Int. Cl.$^5$ ............................................. G01L 21/32
[52] U.S. Cl. ..................................... 324/460; 324/459; 324/462; 250/374
[58] Field of Search ............... 324/459, 460, 462, 464, 324/470; 250/374, 252.1 R

[56] References Cited

U.S. PATENT DOCUMENTS

| | | | |
|---|---|---|---|
| 3,356,287 | 12/1967 | Winters | 230/69 |
| 3,495,165 | 2/1970 | Cobine et al. | 324/33 |
| 3,742,343 | 6/1973 | Pittaway | 324/33 |
| 3,743,876 | 7/1973 | Redhead | 313/7 |
| 3,839,655 | 10/1974 | Helgeland et al. | 313/7 |
| 4,307,323 | 12/1981 | Bills et al. | 315/111.91 |
| 4,747,311 | 5/1988 | Hojoh | 324/460 X |
| 4,792,763 | 12/1988 | Haas | 324/462 |
| 4,902,977 | 2/1990 | Kenny et al. | 324/462 |
| 5,128,617 | 7/1992 | Bills | 324/459 |

FOREIGN PATENT DOCUMENTS 3042172 6/1982 Fed. Rep. of Germany .
2454696 11/1980 France .

OTHER PUBLICATIONS

"Long term behaviour of ionization gauges", K. F. Poulter & C. M. Sutton, *Vacuum*, vol. 31, No. 3, pp. 147-150, 1981.
"Reliability of high vacuum measurements", C. R. Tilford, *J. Vac. Sci. Technol.*, A1 (2), Apr.-Jun. 1983, pp. 152-162.
"Performance characteristics of a broad range ionizat ion gage tube", C. R. Tilford & K. E. McCulloh, J. Vac. Sci. Technol., 20(4), Apr. 1982, pp. 1140-1143.
"Procedure for Calibrating Hot Filament Ionization Gauges Against a Reference Manometer in the Range $10^{-2}$-$10^{-5}$ Torr", Journal of Vacuum Science & Technology Standard AVS Jun. 4, 1969, pp. 370-374.

(List continued on next page.)

Primary Examiner—Kenneth A. Wieder
Assistant Examiner—Glenn W. Brown
Attorney, Agent, or Firm—Sixbey, Friedman, Leedom & Ferguson

[57] ABSTRACT

Ionization gauge and method of operating same where the gauge may be of the Bayard-Alpert type and include a shield which completely encloses the electron source, the anode, and the collector electrode so that potentials external to the shield do not disturb the electric charge distribution within the shielded volume to thus stabilize the sensitivity of the gauge. The ionization gauge is further characterized by the following features which may be present either alone or in combination including: (a) the anode is provided with end caps which extend radially inward at least 25% of the radius of the anode but not more than 75% of the radius; (b) the ion collector has a diameter of not less than 0.015 in. and not more than 0.080 in.; (c) the ion collector extends at its free end at least through one of the partial end caps of the anode; (d) the electron source is not substantially longer axially than the region within the anode volume in which the electric field is predominantly directed radially inward and where the electron source is located substantially only adjacent to the foregoing region; (e) the anode is provided with a substantially uniformly transparent grid structure in the regions where the electrons enter the anode volume and where they exit from the anode volume.

94 Claims, 6 Drawing Sheets

OTHER PUBLICATIONS

"Summary Abstract: A thin-collector Bayard-Alpert gauge for $10^{-12}$ Torr Vacuum" H. C. Hseuh & C. Lanni, J. Vac. Sci. Technol., A5(5), Sep./Oct. 1987, pp. 3244–3246.

"Sensitivity variation of Bayard-Alpert gauges with and without closed grids from $10^{-4}$ to 1 Pa", R. N. Peacock & N. T. Peacock, J. Vac. Sci. Technol., A8(4), Jul./Aug. 1990, pp. 3341–3344.

"Collector Dimensions and Sensitivity in BayaRD Alpert Ionization Gauge", by J. Groszkowski, Bulletin De L'Acadamie, vol. XIII, No. 2-1965, Jan., 1965.

"Cathode Dimensions and Sensitivity in Bayard-Alpert Ionization Gauge", by J. Groszkowski, Bulletin de L'Acadamie, vol. XIII, No. 3-1965, Jan. 25, 1965.

"Accurary of vacuum gauges", Wolfgang Jitschin, J. Vac. Sci. Technol. A 8(2), Mar./Apr. 1990, pp. 948–955.

European Organization for Nuclear Research, "Low Pressure Limit of The Bayard-Alpert Gauge", by C. Benvenuti and M. Hauer, Geneva, Aug. 2, 1976.

Patent Abstracts of Japan, vol. 6, No. 234 (E-143) (1112) Nov. 20, 1982 JP-A-57 134 855.

IONIZATION GAUGE AND METHOD OF USING AND CALIBRATING SAME

RELATED APPLICATIONS

This application is (a) a continuation-in-part of application Ser. No. 07/778,371 filed Oct. 17, 1991 and (b) also a continuation-in-part of application Ser. No. 07/507,579 filed Apr. 11, 1990 (which application has now issued as U.S. Pat. No. 5,128,617 on Jul. 7, 1992).

BACKGROUND OF INVENTION

1. Field of the Invention

The present invention relates to vacuum gauges such as Bayard-Alpert (BA) ionization gauges and to systems and methods for operating and calibrating such gauges.

2. Discussion of the Prior Art and Summary of the Invention

The BA gauge is the simplest known non-magnetic means of measuring very low pressures and has been widely used worldwide essentially unchanged since being disclosed in U.S. Pat. No. 2,605,431 in 1952.

A BA gauge system consists of a BA gauge and controller circuitry. A prior art BA gauge consists of a heated cathode for emitting electrons, a cylindrical grid or anode for accelerating the emitted electrons to ionizing energy, a very small cross section collector electrode on axis for collecting the ions formed within the anode volume by collision of energetic electrons with gas molecules and a vacuum envelope surrounding the gauge electrodes and attaching to a vacuum system wherein an unknown gas pressure is to be measured. Controller circuitry consists of a means to apply suitable potentials to the anode, to the cathode and to the collector electrode, means for heating the cathode to provide a controlled electron emission current and means for measuring the collector current and means for calculating and displaying the indicated pressure.

To a first approximation, the ion current, $i_+$, to the collector electrode is proportional to the electron emission current $i_-$, and to the gas density in the gauge or at constant temperature to the gas pressure, $P_G$, in the gauge. Thus, $$i_+ = S i_- P_G \qquad \text{Eq. 1}$$

where S is a constant of proportionality commonly called the gauge sensitivity.

S can be calculated by measuring $i_+$ and $i_-$ when the gas pressure $P_{GK}$ in the gauge can be determined by other calibration means. Thus, $$S = i_+ / (i_- P_{GK}) \qquad \text{Eq. 2}$$

where $P_{GK}$ is the known pressure in the gauge. The value of S thus determined can be utilized to calculate the value of an unknown gauge pressure $P_x$ which produces an ion current, $i_{+x}$ at the same value of $i_-$ used to determine S in Eq. 2 provided conditions in the gauge do not change. Thus, $$P_x = i_{+x} / (i_- S) \qquad \text{Eq. 3}$$

Very complex and costly non-BA gauges have been described which are claimed to provide excellent accuracy of measurement over a limited pressure range. However, these laboratory devices are entirely unsuitable for everyday use in research and industry and have yielded few clues if any as to how to improve the accuracy of the simple prior art BA gauge.

Numerous studies over the years have demonstrated conclusively that S is not constant in prior art BA gauges. For example, Poulter and Sutton at the National Physical Laboratory in the United Kingdom reported that a typical prior art BA gauge calibration "drifted at a rate of $-1.4\%$ per 100 operating hours when it was kept under vacuum but similar gauges exposed to atmospheric conditions showed sharp changes of up to 25% in their sensitivity", K. F. Poulter & C. M. Sutton, Vacuum, 31, 147-150 (1981). In another representative study, Tilford at the U.S. National Bureau of Standards reported that typical prior art nude BA gauges (BA gauges without vacuum envelopes) had sensitivities which varied from 70% to 110% of that specified by the manufacturer, C. R. Tilford, J. Vac. Sci. Technol., A1(2), 152-162 (1983). In another study, repeated calibrations of seven prior art "broad range" BA gauges showed sensitivities varying from 52% to 67% of their specified values, C. R. Tilford, K. E. McCullogh, H. S. Woong, J. Vac. Sci. Technol., 20(4), 1140-1143 (1982).

Ionization gauge systems must be calibrated against a primary or secondary pressure standard to be useful. Users of prior art BA gauge systems have been provided with three alternatives to secure required accuracy of vacuum measurement.

1. Calibrate the ionization gauge system in situ utilizing, for example, an expensive spinning rotor gauge. Such a solution is being actively promoted now by several spinning rotor gauge suppliers. The prior art gauge may change calibration at anytime, so frequent in situ calibration is required. This alternative provides the best accuracy but is extremely time consuming, inconvenient and costly.

2. Send the ionization gauge system to a separate calibration facility and have the system calibrated—an expensive, time consuming alternative at best because the prior art gauge may change calibration anytime with use. This alternative enables the user to comply with certain governmental requirements but is unlikely to result in improved accuracy over the long term.

3. Use the generic calibration data supplied by the manufacturer assuming it is accurate for the prior art BA gauge in use. This generic calibration data is typically obtained by measurements on one or more prototypes and consists of a fixed value of the sensitivity S for a given gas type and a list of the nominal applied electrode potentials.

The huge majority of users opt for the last alternative because of the large expense and inconvenience of either of the other alternatives even though using generic calibration data provides vacuum measurements grossly in error.

What is needed is better means for providing generic calibration data that will yield more accurate vacuum measurements.

Many researchers have pointed out for years that S is not a constant but depends on gas species, electron energies, emission current, electric field distributions, gas density, kinetic energy of the gas molecules in the gauge, plus several other parameters. But from all this work there have been no solid clues on how to improve the accuracy of the prior art BA gauge and the inaccuracy remains the same as when the device was invented. From the vantage point achieved through computer simulation of electron and ion trajectories in a BA gauge, it is now possible to discern deficiencies in the prior art which help cause the observed large inaccuracies in prior art BA gauge systems.

It is well known that the performance of BA ionization gauges can be seriously affected by a phenomenon known as surface ion desorption. An effective way of minimizing this effect is by utilizing an anode which has minimum surface area. Thus, to minimize surface ionization inaccuracies all low pressure BA gauge designs utilize transparent grids with minimal surface area. When such open grids are used, energetic electrons are not confined to the anode volume but travel a significant fraction of their total path length outside the grid. These energetic electrons traveling outside the anode volume can impinge on exposed insulating surfaces and uncontrollably change the surface potential of the exposed insulator. Their trajectories may also be changed by uncontrolled potentials outside the anode volume. Utilizing computer simulation, one can determine if energetic charged particles will impact an exposed surface or if trajectories are influenced by potentials outside the anode volume for any given configuration of surfaces, potentials, energy and initial trajectory of the charged particles.

The total electric charge distribution in a BA gauge is the sum of the charge distribution on the surfaces exposed to impact by charged particles and the charge distribution due to free charges within the gauge volume. In prior art BA gauges, means have not been provided for adequately fixing the electric charge distribution in that region of the gauge accessible to energetic charged particles. Thus, the electric charge distribution can vary from measurement-to-measurement in the same gauge or from gauge-to-gauge at any given pressure. Thus, because the electric charge distribution which exists during calibration cannot be duplicated during use, inaccurate pressure indications result.

Applicants have found by computer simulation that seemingly trivial changes in the electrode geometry or in surface potentials in the gauge volume accessible to energetic charged particles can cause large changes in electron trajectories. It is well known that changes in electron trajectories cause changes in the radial position, $r_o$, of ion formation resulting in changes in the angular momentum, $m\,r_o\,v_T$, of the ion, where m is the mass of the ion and $v_T$ is the tangential component of its velocity. Changes in angular momentum cause the probability of ion collection to change as is well known, thus causing the gauge sensitivity to change. Changes in gauge sensitivity cause measurement inaccuracies.

Prior art BA gauges can be categorized as to the manner in which and the degree to which the electric charge distribution on surfaces exposed to charged particle impact in the gauge are uncontrolled.

1. Glass Envelope BA Gauges

The huge majority of BA gauges in use have glass vacuum envelopes where the entire inner surface of the gauge is exposed to energetic charged particles. Energetic electrons and ions can impact on these insulator surfaces and charge them to uncontrolled potentials. Thus, in glass gauges the electric charge distribution on the insulator surfaces is totally uncontrolled. Abrupt changes in indicated pressure of 50% or more are regularly observed at $10^{-5}$ Torr or higher particularly at lower emission currents.

2. Glass Envelope BA Gauges with Conductive Coatings

Conductive coatings such as stannous oxide and platinum have been deposited on a portion of the inner glass wall of BA gauges and held at a fixed potential, as disclosed, for example, in U.S. Pat. No. 3,839,655. However, in all such prior art devices the glass insulators and substantial areas of the inner glass surface have remained uncoated and exposed to energetic charged particles. Thus, the exposed glass insulator surfaces can charge up uncontrollably and change the electric charge distribution in such prior art devices. Applicants have found that changes in port diameter or even in the length of the port tubulation affect the charge distribution in prior art devices.

3. Nottingham Gauge

Nottingham at M.I.T. positioned a screen grid between the glass wall and the BA gauge electrodes but did not enclose the ends of the screen grid, W. B. Nottingham, AVS Vac. Symp. Trans. 8 494 (1961). The anode ends were enclosed with grids but the screen grid ends were left open. Thus, the exposed glass surfaces on both ends of the gauge can charge up uncontrollably and change the electric charge distribution in the gauge.

4. Nude Gauge with Exposed Feedthru Insulators

So-called nude gauges have the electrode assembly mounted on a metal flange which is penetrated by multiple feedthru insulators. In this regard, see, for example, Varian Associates Series UHV 24 Specification Sheet. The collector electrode feedthru is invariably covered with a metal shield to prevent soft x-rays from impinging on the collector electrode support thus decreasing the indicated base pressure of the gauge. The remaining feedthru insulators are exposed to energetic charged particles and can charge up uncontrollably and change the electric charge distribution.

5. Nude Gauge Used With Undefined Enclosure Geometry

Nude gauge electrode assemblies are intended to be inserted into a metal vacuum system. The interior surfaces of the vacuum system surrounding the electrode structure help to define the electric field configuration in regions traversed by electrons. A nude gauge is typically calibrated in one vacuum system geometry and used in a different geometry or even exposed to different potentials. The electric charge distribution in such cases is different during use from that present during calibration. Thus, the indicated pressure cannot be accurate.

The American Vacuum Society Standard 6.4, "Procedure For Calibrating Hot Filament Ionization Gauges Against A Reference Manometer In The Range $10^{-2}$-$10^{-5}$ Torr" contains no directives, cautions, nor any hints that the electric charge distribution must be controlled to achieve accurate pressure indication.

In AVS Standard 6.4 there is a note: "The position of the tube relative to the chamber wall and the temperature of the chamber wall exposed to the tube are factors in the gauge calibration and, hence, should duplicate actual usage as nearly as possible". This note is made in the context of ensuring that all gauges are symmetrically placed so that gas temperatures and conductances are the same for the test gauges and reference manometers.

U.S. Pat. No. 3,742,343 discloses a Groszkowski gauge wherein a cylindrical electrical conducting screen is described for use in a nude ion gauge to ensure repeatability of pressure measurement in various configurations of the vacuum system. However, the screen described does not completely enclose the end of the screened region. Thus, variations in the electric charge distribution on unshielded exposed surfaces can affect the sensitivity.

In 1986 Hseuh and Lanni at Brookhaven National Laboratory tested 400 custom nude BA gauges in different specified diameter metal envelopes and observed considerable variation in sensitivity S, see H. C. Hseuh & C. Lanni, J. Vac. Sci. Technol. A5 (3) September/October 1987, p.3244. Neither screens on the port end nor insulator shields were present during these tests. Thus, the electrical charge distribution on exposed surfaces could vary during testing, thus affecting the sensitivity.

In a recent research paper, Peacock and Peacock reported on tests on nude gauges with and without closed ends on the anodes, see R. N. Peacock and N. T. Peacock, j. Vac. Sci. Technol., A Vol. 8, No. 4, July/August 1990. The authors state, "To obtain reproducible conditions all nude ionization gauges were operated in nipples 97 mm long by 33 mm inside diameter. These were provided with a screen at the chamber end of the nipple to prevent ion coupling between gauges. The tubulated glass gauge had a similar screen on its flange." However, no insulator shield is provided on the tested gauges.

In addition to the foregoing considerations, to the best of applicants' knowledge, no prior art nude gauge manufacturer nor distributor has provided the pertinent dimensions of the controlled environment used to provide a generic calibration of the gauge. Thus, the user has no means to duplicate the generic calibration geometry during use and the pressure indications are therefore likely inaccurate.

6. BA Gauges With Large Tolerance Electrode Geometry

A cursory examination of any ten commercially available prior art BA gauges with the same part number will reveal significant dimensional differences in electrode positions. Variations of as much as 0.25" are evident in some products. Because the electric charge distribution is not at all the same in such gauges as in the prototype gauge which was actually calibrated by the manufacturer, large inaccuracies in indicated pressure can be observed when the generic calibration data is used.

7. BA Gauges With Electrode Geometries That Change With Time.

Designers of prior art BA gauges have failed to take the necessary precautions to maintain all electrode positions constant with use. Most glass BA gauges utilize untensioned and unsupported hair pin shaped cathodes which typically sag and move by tenths of inches in long term use. Bifilar wire anodes sag and warp in long term use. Ion collectors that are not adequately stress relieved can change shape over time especially when subjected to high temperatures during electron bombardment degassing. In some nude gauges the collector electrode position changes with externally applied force on the feedthru pin. Bimetallic joints cause electrode motion as the power input into the gauge varies. In some prior art BA gauges the collector electrode is so long and flimsy that in use it vibrates with a relatively large amplitude that changes with external conditions. Because the electric charge distribution changes uncontrollably with time in such gauges, the gauge becomes inaccurate.

8. BA Gauges With Electrodes Fixed Relative To One Another But With Large Tolerance Between Electrodes and Enclosure In many prior art gauges it is common to observe relatively large variations in the location of the entire electrode structure relative to the vacuum envelope. Such variation, of course, affects the electric charge distribution in the volume accessible to energetic electrons. Changes in the electric charge distribution cause inaccuracies in the indicated pressure gauge to gauge.

Thus, the situation with prior art BA gauge systems is as follows: The electric charge distribution on surfaces in prior art gauges is so ill-controlled that there is little point in providing generic calibration data for a given gas type other than (1) a constant value for the sensitivity for use at all pressures, (2) nominal values of potentials applied to the cathode and anode relative to ground, and (3) a nominal value of the emission current used during calibration.

Thus, even though it has long been known that the BA gauge calibration depends on a number of variables, it has not been possible to correct the indicated pressure in a prior art BA gauge system for changes in any or all of the variables.

What is needed is a better approach to providing a more accurate BA gauge system.

Thus, a primary object of the present invention is to provide significantly greater accuracy of vacuum measurement than has heretofore been possible with prior art ionization gauges such as BA gauges.

Applicants have discovered that the ion collection probability in a BA gauge and therefore the BA gauge sensitivity is far more influenced by minor variations in the electric charge distribution than has been previously assumed. Seemingly trivial changes in electrode geometry or in surface potentials can cause large changes in electron trajectories. As is well-known in the art, changes in electron trajectories cause changes in the radial position, $r_o$, of ion formation resulting in changes in the angular momentum, $m\, r_o\, v_T$, of the ion, where m is the mass of the ion and $v_T$ is the tangential component of its velocity. Changes in angular momentum cause the probability of ion collection to change thus causing the gauge sensitivity to change. Changes in gauge sensitivity cause measurement inaccuracies whenever the sensitivity has been assumed to be constant.

It is thus a further primary object of the present invention to provide means to maintain electric charge distributions on surfaces exposed to charged particle impact, constant gauge-to-gauge and over time so that the gauge sensitivity, although not a constant over the pressure range, is more repeatable measurement-to-measurement in the same gauge and more reproducible gauge-to-gauge when preferably used with a well-defined set of calibration measurement parameters. Thus, greater throughput may be obtained in various industrial processes since it becomes unnecessary to operate at needlessly low pressures where time may be wasted until the system can be pumped to achieve low indicated pressures.

The above calibration parameters are those which affect the gauge sensitivity, namely gauge type, electrode voltages, gas type, emission current, cathode heating power and pressure. This more stable sensitivity can then be corrected utilizing algorithms and stored generic values of the collector current, cathode heating power and gauge sensitivities obtained during a prior calibration run at representative values of each parameter. Up to now there has been no hope of correcting the sensitivity of prior art gauges because the electric charge distribution on gauge surfaces has been so unstable.

It is a further object of the present invention to provide hardware and software for storing generic values for gauge type, electrode voltages, gas type, emission current, collector current, cathode heating power and sensitivity. Hardware and software are provided for measuring the collector electrode current at an unknown pressure, $P_x$, selecting the correct sets of stored generic values, calculating the correct values of the sensitivity and indicated pressure and displaying the correct value of the indicated pressure. It is a further object to measure, in addition to the collector electrode current, the cathode heating power and to also utilize the measured cathode heating power When calculating the correct values of sensitivity and indicated pressure.

It is a further object to provide a method for utilizing the above hardware and software to produce a more accurate measurement than has previously been possible.

It is a further object of the present invention to provide a calibration method which compensates for changes in work function of the gauge cathode from gauge to gauge and for a particular gauge over a period of time.

In addition to the foregoing considerations, it should be emphasized that the main function of an ionization gauge in the huge majority of commercial applications is to assist in the determination of the earliest possible time that the next step in a vacuum process can appropriately be proceeded to—for example, in the manufacture of a computer chip. An inaccurate ionization gauge which unpredictably reads too low may indicate that the next step in the vacuum process is to be taken prematurely resulting in product defects, or if it reads too high it may cause further vacuum processing to be delayed, thus increasing costs. Such gross inaccuracies of prior art ionization gauges have been described hereinbefore.

Applicants have determined by computer simulation and by actual test that several of the features provided in prior art BA gauges are leading contributors to the inaccuracies of prior art BA gauges. By replacing these features with the improved new features of the present invention, applicants have been able to achieve a ten-fold improvement in accuracy of measurement.

For the past 30 years, all commercial BA gauges have utilized an ion collector with a diameter of about 0.010 in. or less. The conventional wisdom has been that a small diameter collector presents a smaller target for the x-rays produced when electrons are collected on the anode, thus helping to reduce the lower pressure limit of the gauge. Applicants have found that a small diameter ion collector is not desirable for providing a stable, accurate ionization gauge, and that a small diameter ion collector is not necessary to achieve a low x-ray limit provided other features are provided in the gauge design.

Groszkowski, among others, has investigated the dependence of sensitivity in a BA gauge on ion collector diameter and length, see J. Groszkowski, Bulletin De L'Academie Polonaise Des Sciences, Vol. XIII, No. 2, 1965, p 177–183. He studied collector diameters from about 0.004 in. to about 0.080 in. diameter. His conclusion was that a smaller collector diameter improved the lower pressure limit of the gauge although at the expense of reduced sensitivity. Groszkowski makes no recommendations concerning how to improve the stability and accuracy of a BA gauge. Groszkowski in the same report also concluded that shorter ion collectors helped to reduce the lower pressure limit of the Bayard Alpert gauge although at the expense of reduced sensitivity. He drew no conclusions about the effect of length of the collector on stability nor accuracy.

Benvenuti and Hauer at the European Organization for Nuclear Research reached similar conclusions on collector diameter as did Groszkowski, see C. Benvenuti and M. Hauer, CERN-ISR-VA/76-32, Closed Distribution, Geneva, 2nd August 1976. These investigators made no recommendation on improving the stability and accuracy of BA gauges.

In still another report Groszkowski studied the influence of cathode dimensions on he sensitivity of BA gauges, see J. Groszkowski, Bulletin De L'Academie Polonaise Des Sciences, Vol. XIII, No. 3, 1965, p. 43 [261] to 45 [263]. He concluded that varying the length of the cathode in a BA gauge changed the sensitivity by, at most, 10%. He drew no conclusions on how to improve the stability and accuracy of the BA gauge.

Jitschin, at the Physikalisch-Technische Bundesanstalt Institut Berlin, has recently reviewed the available literature on accuracy of vacuum gauges including BA gauges, see W. Jitschin, J. Vac. Sci. Technol. A 8(2) March/April 1990, p. 948–956. Jitschin speculates that most of the instabilities in BA gauges are due to changes in surface properties of the electrodes and changes in the emissivity of the cathode. He reports no conclusions from the literature on how to improve the stability and accuracy of BA gauges.

It is therefore, a further primary object of this invention to provide means for causing a Bayard Alpert ionization gauge to measure pressure significantly more accurately utilizing at least the following features either alone or in combination.

One feature of the present invention is the minimization of axial electric field components over most of the axial length of the anode volume. Minimization of axial electric field components is accomplished by using partial end caps on the anode preferably in combination with a relatively long ion collector. Partial end caps serve to cause the electric field within the anode volume to have negligible axial field components much closer to the ends of the anode than is possible without end caps or with full end caps. The partial end caps greatly reduce the regions near the ends of the anode where the axial components of the electric field exist.

The use of a relatively long ion collector helps to cause the electric field within the anode volume to be predominately radially directed much closer to the end of the anode where the ion collector terminates. Thus, the axial length of the region where significant axial electric fields exist within the anode volume is further reduced by use of a long ion collector.

Another feature of the present invention is the use of a cathode with a reduced length emission zone relative to the anode length. This has a twofold purpose. One is to cause ionization to occur predominately within that portion of the anode volume in which the field is predominately radially directed and not in the ends where axial field components exist. Another purpose is to prevent electron emission from entering into the ends of the anode where axial field components exist which can greatly affect electron path length.

The above features work together to help prevent uncontrollable variations in emission density along the length of the hot cathode from affecting the fraction of ions collected and from affecting the total electron path length.

Another feature is the use of a relatively large diameter ion collector. Such a collector helps to collect a significantly larger fraction of the ions which are formed, reducing ion orbiting and thus reducing ion space charge. Reducing ion space charge helps to prevent fluctuations in ion space charge from affecting gauge accuracy.

A further feature of the present invention is the provision of maximum transparency in those regions of the anode where emitted electrons cross the anode volume boundary from one side of the anode surface to the other side. In the present invention the electron stream preferably tends to follow a reasonably well-defined path at least for several passes through the anode. By achieving maximum transparency in the anode regions where the electron stream crosses from one side of the anode boundary to the other, increased gauge sensitivity is achieved and small fluctuations in the path the electrons take have a reduced effect on gauge accuracy.

These new features provide significantly improved accuracy in an ionization gauge.

These and other objects of the invention will become apparent from a reading of the following specification taken with the drawings and claims.

DESCRIPTION OF PREFERRED EMBODIMENTS

Figure 1:
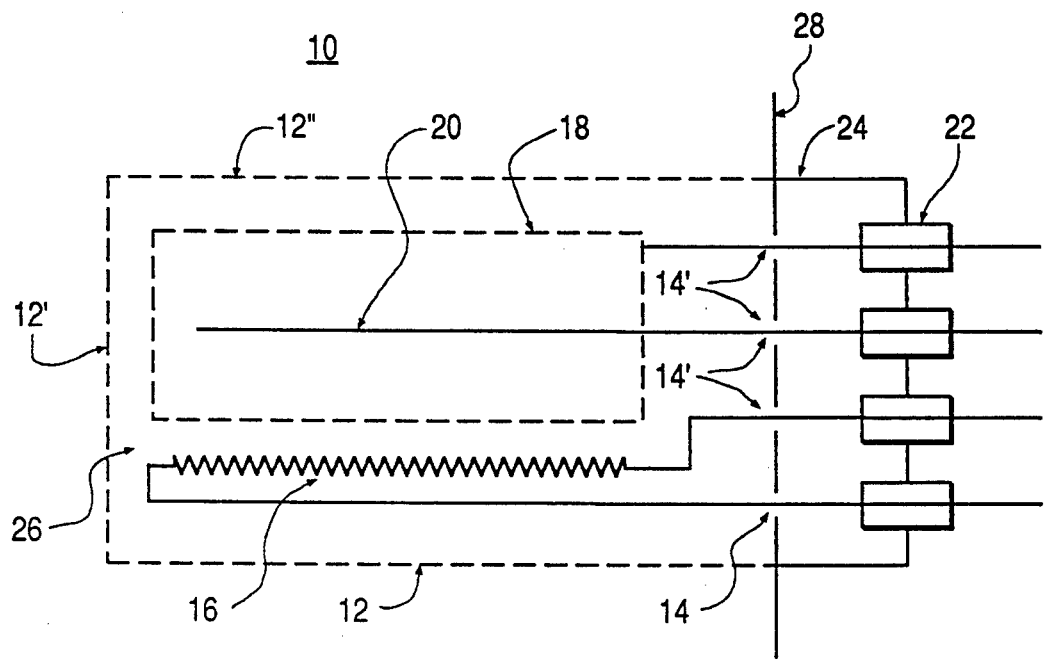
FIG. 1 is a schematic cross-sectional view through the axis of a first illustrative embodiment of a gauge in accordance with the invention.

Reference should now be made to the drawing where like reference numerals refer to like parts.

Figure 3:
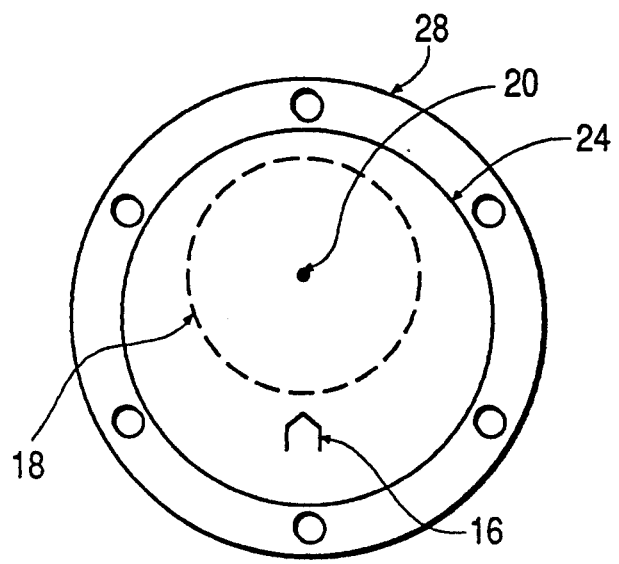
FIG. 3 is a schematic end-on view of the gauges of FIGS. 1 and 2.

Referring to FIGS. 1 and 3, a nude gauge assembly 10 of the BA type in accordance with the present invention comprises a gas permeable, metallic shield 12 (which may be cylindrical in configuration), an open, metallic, insulator shield 14, a cathode or electron source 16, an anode 18 (which may also be cylindrical in configuration), a collector electrode 20, insulated vacuum feedthroughs 22, a vacuum enclosure 24, and a flange 28 to attach the gauge to the vacuum system.

The shield 12 and the insulator shield 14 are preferably connected to each other and are preferably grounded and serve to define a shielded volume 26 wherein the electric charge distribution on the gauge surfaces is not disturbed by potentials external to shielded volume 26.

In general, shield 12 and insulator shield 14 may be considered a shield means or outer electrode which is at least partially open (mesh-like, for example) and which completely surrounds the cathode, anode and collector electrode disposed within shielded volume 26. The shield means is at least partially open to permit transfer of gas molecules in and out of the shielded volume. Moreover, the shield means (and insulator shield 14, in particular) is at least partially open at 14' to permit electrical connections to the cathode, anode, and collector electrode so that the latter electrodes are electrically isolated from the shield means.

Due to the grounding of the shield means, any electrons or ions generated within the shielded volume which contact the shield means will be passed to ground while any potentials (which may be quite large depending on the process) external to the shielded volume will have no effect on the electric charge distribution on gauge surfaces within the shielded volume. Thus, stabilization of the gauge sensitivity is achieved in this first important respect. Means and procedures for obtaining further stabilization are described below.

Figure 2:
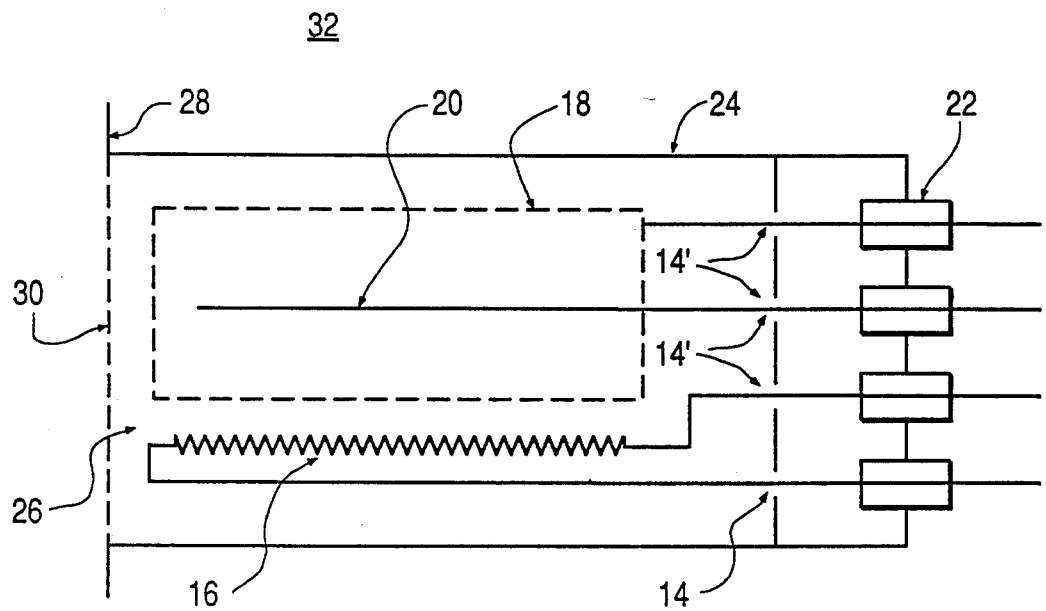
FIG. 2 is a cross-sectional view thru the axis of another illustrative embodiment of a gauge in accordance with the invention.

FIGS. 2 and 3 illustrate another embodiment of a non-nude (modest) gauge 32 wherein a metallic vacuum enclosure 24 serves the same function as longitudinally extending portion 12" of the shield 12 in FIG. 1. A metallic, gas permeable plasma shield 30 serves the same function as the end 12' of the shield 12 in FIG. 1. Thus, in FIG. 2, the shield means includes vacuum envelope 24, plasma shield 30, and insulator shield 14 where, as in the FIG. 1 embodiment, the shield means is preferably grounded.

If the vacuum enclosure 24 is made of glass, an electrically conductive coating may be provided on the inner surface thereof to provide the function of portion 12" of FIG. 1. Alternatively, a screen grid may be provided between a glass vacuum enclosure where the screen would provide the function of portion 12" of FIG. 1. Other means for completely enclosing shielded volume will occur to those of ordinary skill in this art.

In the embodiments of FIGS. 1 and 2, the dimensions of the shield means are preferably maintained substantially the same in both embodiments. Moreover, the locations of the cathode, anode, and collector electrode with respect to the shield means are substantially the same over time and from gauge to gauge so that there is no change in the electric charge distribution on surfaces within the shielded volume which would otherwise be caused by variations in the location of these elements with respect to the shield means.

Moreover, in FIGS. 1 and 2, all dimensions of hot cathode 16, anode 18 and collector electrode 20 are maintained fixed over time and gauge to gauge so there is no change in the electric charge distribution on gauge surfaces due to changes in electrode dimensions.

Furthermore, in FIGS. 1 and 2 the positions of cathode 16, anode 18 and collector electrode 20 are maintained fixed relative to one another over time and gauge to gauge so there is no change in the electric charge distribution due to electrode location.

The location of the gauge electrode surfaces can be fixed over time in the same gauge and from gauge-to-gauge by utilizing good mechanical design and construction techniques which are well-known in the art of electron tube design and construction. The cathode, as is known, can be prevented from sagging in use by utilizing a small spring to tension the cathode. Motion due to bimetallic joints can be avoided by proper joint design. Close tolerance electrode structures can readily be assembled using proper jigs and fixtures as is well-known in the art. Proper design of the feedthrough insulator as is well-known in the art insures that reasonable stresses applied to the feedthrough outside the gauge will not move the surfaces inside the gauge.

Figure 4:
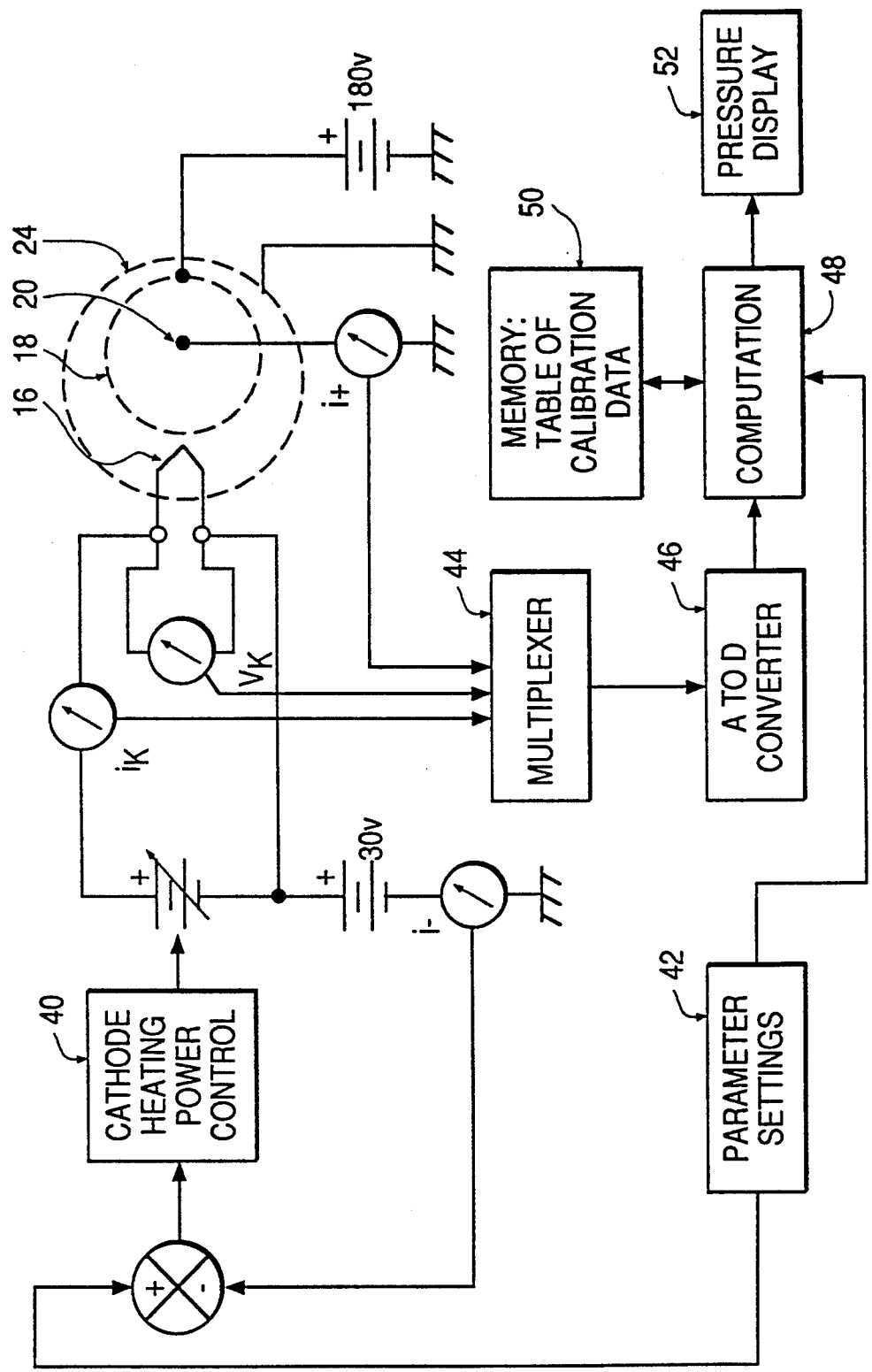
FIG. 4 is a schematic block diagram of an illustrative gauge and controller in accordance with the invention.

Referring to FIG. 4, illustrative controller circuitry in accordance with the present invention consists of a cathode heating power control 40 which maintains a constant emission current, $i_-$, from the hot cathode, 16, in accordance with a pre-selected value stored in the parameter setting block 42. Also stored in block 42 is the gauge tube type, electrode voltages and gas type information which the user has pre-selected. A multiplexer 44 and an A/D converter, 46, digitizes the measured analog values of the ion collector current, $i_+$, the cathode heating current $i_K$, nd the cathode heating voltage, $V_K$.

As described below, the collector current $i_+$ may be uniquely utilized in the calibration technique of the present invention to compensate for the variation in gauge sensitivity S with pressure. Digitized values of $i_+$ are supplied to the computation block 48 where this data is combined with generic pressure calibration information stored in memory 50. The correct value of S is calculated. Then the correct value of unknown pressure $P_x$, in the gauge is calculated in block 48 and fed to the pressure display 52, for display.

Moreover, as will also be described below, the cathode heating voltage and current (or power) may be uniquely utilized in the calibration technique of the present invention to compensate for varying characteristics of the cathode such as the work function thereof. Digitized values of the cathode heating voltage and current and the collector current $i_+$ are supplied to the computation block 48 where this data is combined with generic pressure calibration information stored in memory 50. The correct value of S is calculated. Then the correct value of the unknown pressure $P_x$, in the gauge is calculated in block 48 and fed to the pressure display, 52, for display.

The above calibration methods and apparatus are preferably utilized with the gauge configurations of FIGS. 1-3 and equivalents thereof but may also be employed with other ionization gauges including BA gauges provided they are sufficiently stable. In this regard, it is noted that the foregoing calibration methods and apparatus can be utilized because of the high degree of stability of the sensitivity of the gauges of FIGS. 1-3 and equivalents thereof. That is, heretofore, due to the instability of the sensitivity of prior art gauges, it has not been practical to utilize the calibration methods and apparatus of the present invention.

A description will first be given of how the cathode heating power may be utilized to compensate for varying characteristics of the cathode such as the work function thereof. It will then be seen that the utilization of the collector current $i_+$ to compensate for sensitivity variations may be treated as special case when it is not desired or necessary to correct for changes in the cathode heating power.

Generic pressure calibration data as shown in Table 1 is stored in memory. This data is preferably obtained by averaging measurements utilizing two or more (twenty, for example) BA ionization gauge systems in accordance with the present invention using known pressure calibration apparatus. In particular, data set A of Table 1 corresponds to low cathode heating powers needed to produce an electron emission current of 100 μA, data set B to medium Cathode heating powers required to produce this emission current, and data set C to high cathode heating powers. Thus, with respect to data set A, $i_1$, $W_{1A}$, and $S_{1A}$ are the average collector current i, cathode heating power W, and sensitivity S of twenty (for example) gauges of the present invention for a first known calibration pressure; $i_2$, $W_{2A}$, and $S_{2A}$ are the average collector current, cathode heating power, and sensitivity for a second known calibration pressure greater than the first calibration pressure; etc. The number of calibration pressures will extend over the desired pressure measurement range.

TABLE 1

EXAMPLE OF CALIBRATION DATA SETS FOR A GIVEN GAUGE TYPE AND FOR GIVEN ELECTRODE POTENTIALS

| Data Set, | Gas Type, | $i_-$ | $i_1$, | $W_1$, | $S_1$ | $i_2$, | $W_2$, | $S_2$ | $i_3$, | $W_3$, | $S_3$ |
|---|---|---|---|---|---|---|---|---|---|---|---|
| A | $N_2$ | 100 μA | $i_1$, | $W_{1A}$ | $S_{1A}$ | $i_2$, | $W_{2A}$, | $S_{2A}$ | $i_3$, | $W_{3A}$, | $S_{3A}$ |
| B | $N_2$ | 100 μA | $i_1$, | $W_{1B}$ | $S_{1B}$ | $i_2$, | $W_{2B}$, | $S_{2B}$ | $i_3$, | $W_{3B}$, | $S_{3B}$ |
| C | $N_2$ | 100 μA | $i_1$, | $W_{1C}$ | $S_{1C}$ | $i_2$, | $W_{2C}$, | $S_{2C}$ | $i_3$, | $W_{3C}$, | $S_{3C}$ |
| D | $N_2$ | 1 mA | $i_1$, | $W_{1D}$ | $S_{1D}$ | $i_2$, | $W_{2D}$, | $S_{2D}$ | $i_3$, | $W_{3D}$, | $S_{3D}$ |

In accordance with the invention, i, W, and S are obtained for the above series of calibration pressures for a plurality of different cathode heating powers required to obtain a predetermined emission current with slightly different degrees of contamination of the emitting surface of the cathode. Thus, data set B will be selected to have cathode heating powers greater than those of data set A while data set C will be selected to have cathode heating powers greater than those of data set B.

The cathode heating powers of data sets A, B, and C preferably extend over the range of expected cathode heating powers of gauges in actual use. Of course, the number of data sets may be changed to insure appropriate representation over the expected range of cathode heating powers. In use, a gauge may be temporarily exposed to contamination such as oxygen from the system being monitored whereby the work function of the cathode will be increased to a certain extent depending upon the degree of exposure. With further usage of the gauge, the degree of change of work function may increase or decrease. Thus, the amount of cathode heating power required to obtain a predetermined amount of emission current will vary from gauge to gauge and over time with respect to a particular gauge. In accordance with the present invention, this variation in the cathode heating power can be compensated by utilizing calibration data typified by data sets A, B, and C.

As discussed above, data sets A, B, and C respectively correspond to cathode heating powers required to obtain an emission current of 100 $\mu$A. 100 $\mu$A is a typical emission current utilized in measurements of high pressure ranges. In lower ranges, a larger emission current such as 1 ma is used and this is exemplified by data set D. Although not shown, there would also be in Table 1, data sets E and F which would respectively correspond to data sets B and C. Of course, whatever number of data sets are required for expected pressures, gas types, emission currents and cathode heating powers can be obtained and employed in Table 1.

For purposes of illustrating the method of using the calibration method of the present invention, assume an unknown gas pressure, $P_x$, is to be measured in $N_2$ Gas type $N_2$ is entered into the parameter settings block 42 by the user using a selector switch, for example. Similarly the desired emission current setting, say, $i_- = 100$ $\mu$A, is entered by the user into block 42. Alternatively, the controller 38 may be arranged to select the optimum value of emission current depending on the current value of the pressure in the gauge as is well-known in the art. This automatically selected value of $i_-$ is then fed to the parameter setting block 42. Parameter setting block 42 is also set for gauge type and electrode potentials applied.

Measurements of the collector current, $i_{+x}$, and the cathode heating current, $i_{kx}$, and voltage, $V_{kx}$, are then obtained at an unknown gas pressure, $P_x$, in the gauge as is well known in the art.

Assume the cathode heating power $W_x = i_{kx} V_{kx}$ to produce the required emission current is calculated in the computation block 48 as is well known in the art. Further assume $W_{1A} \leq W_x \leq W_{2B}$. It remains to calculate the correct value of the sensitivity so that $P_x$ can be calculated and displayed.

The controller circuitry has been previously programmed as is well known in the art to select the two data sets stored in memory 50 which most closely approximate the actual conditions existing during measurement of the unknown pressure $P_x$. Thus, for the assumed conditions for this example of:

| | |
|---|---|
| 1. Gauge type = | same as used for calibration data stored in memory |
| 2. Electrode potentials = | same as used for calibration data stored in memory |
| 3. Gas type = | $N_2$ |
| 4. $i_-$ = | 100 $\mu$A |
| 5. $W_{1A} \leq W_x \leq W_{2B}$, | | data sets A and B are selected out of all the data sets stored in memory because these data sets most closely approximate the conditions existing while the unknown pressure, $P_x$, is being measured. The unique feature of this aspect of the present invention is the selection of the data sets on the basis of the calculated cathode heating powers to thereby compensate variations in the work function, for example, of the cathode from gauge to gauge or with respect to time for a particular gauge. This utilization of the calibration data is preferably employed with the gauge configurations of FIGS. 1-3 and equivalents thereof but may also be employed with other ionization gauges including BA gauges provided they are sufficiently stable.

Note data sets A and B are selected since $W_x$ occurs between (a) $W_{1A}$ where $W_{1A}$ is the cathode heating power associated with the first calibration pressure and the low cathode heating power utilized during the calibration procedure and (b) $W_{2B}$ where $W_{2B}$ is the cathode heating power associated with the second calibration pressure and the medium cathode heating power.

Figure 5:
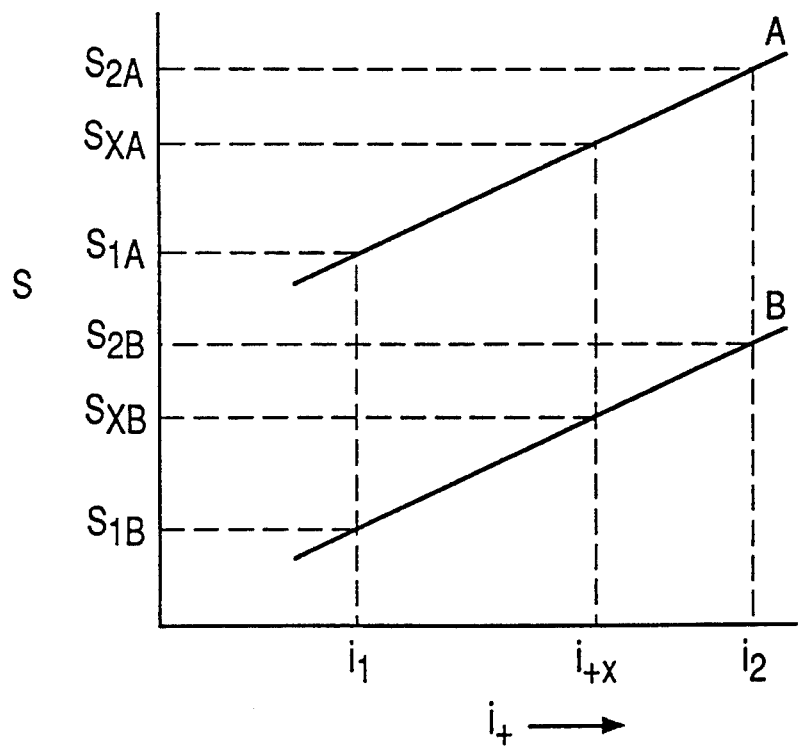
FIG. 5 is an illustrative example of selected data shown in Table 1.

Referring to FIG. 5, the gauge sensitivity, $S_{XA}$, corresponding to any measured value of collector current $i_{+x}$, can be calculated in the computation block 48 according to the equation $$(S_{XA} - S_{1A})/(S_{2A} - S_{1A}) = (i_{+x} - i_1)/(i_2 - i_1)$$

or by rearrangement $$S_{XA} = (S_{2A} - S_{1A})(i_{+x} - i_1)/(i_2 - i_1) + S_{1A}$$

where all the terms on the right are known either from direct measurement or from the data stored in memory 50. $S_{XB}$ can be calculated similarly. $S_{XA}$ and $S_{XB}$ are indicated on FIG. 5.

Figure 6:
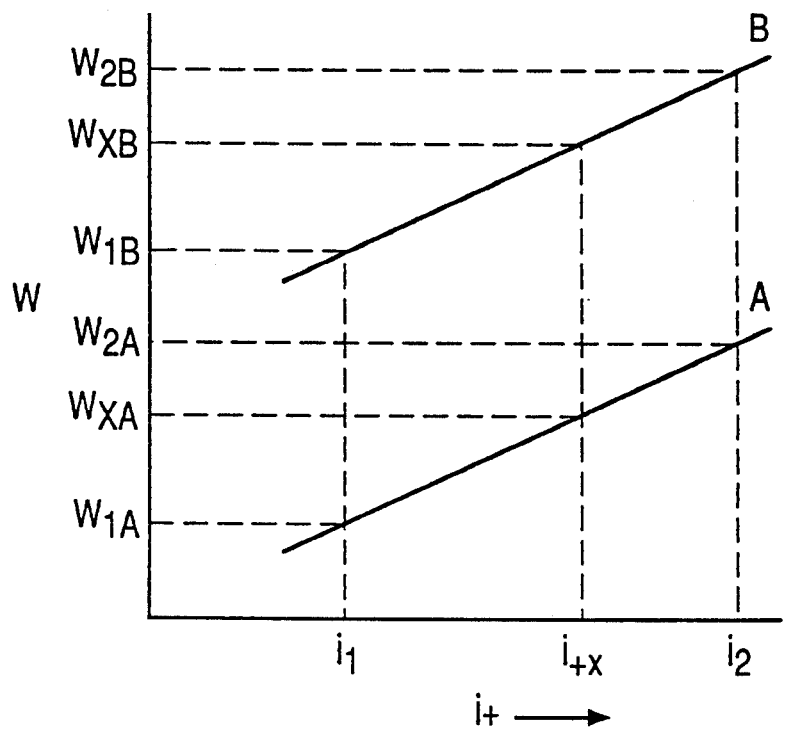
FIGS. 6 and 7 are illustrative examples of calculated data.

Referring to FIG. 6 the cathode heating power $W_{XB}$ corresponding to any $i_{+x}$ can be calculated in computation block 48 according to the equation. , $$(W_{XB} - W_{1B})/(W_{2B} - W_{1B}) = (i_{+x} - i_1)/(i_2 - i_1)$$

or by arrangement $$W_{XB} = (W_{2B} - W_{1B})(i_{+x} - i_1)/(i_2 - i_1) + W_{1B}$$

where all the terms on the right are known either from direct measurement or from data stored in memory 50. $W_{XA}$ can be calculated similarly. $W_{XA}$ and $W_{XB}$ are indicated on FIG. 6.

Figure 7:
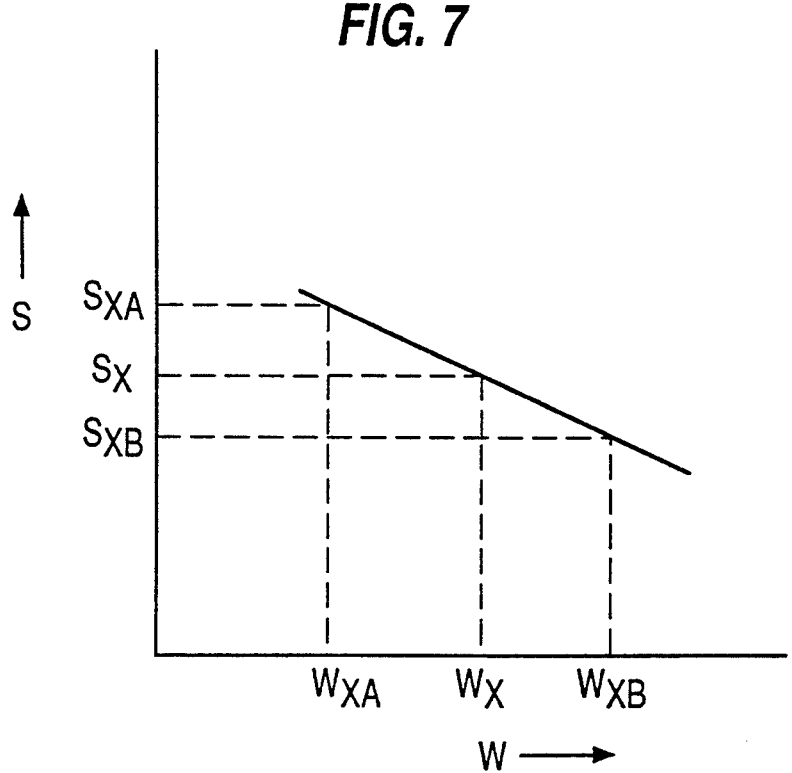

Referring to FIG. 7, the corrected value of the gauge sensitivity, $S_x$, corresponding to any value of $i_{+x}$ can be calculated in computation block 48 according to the equation $$(S_x - S_{XB})/(S_{XA} - S_{XB}) = (W_{XB} - W_x)/(W_{SB} - W_{XA})$$

or by rearrangement $$S_x = (S_{XA} - S_{XB})(W_{XB} - W_x)/(W_{XB} - W_{XA}) + S_{XB}$$

where all the terms on the right are known from prior calculations.

$S_x$ indicated on FIG. 7 is the correct value of the gauge sensitivity corresponding to the actual conditions which existed when $i_{+x}$ was measured at the unknown pressure $P_x$.

This value of $S_x$ is then used in Eq. 3 to calculate the correct value of the unknown pressure $P_x$ which can then be displayed as is well known in the art.

When it is not desired to correct for changes in cathode heating power, data sets A, B and C become identical and FIG. 5 reduces to a single curve, say curve A. In this example the correct value of S, namely $S_{XA}$, can be calculated by interpolation along curve A. This correct value, $S_{XA}$, is then used to calculate and display the correct value of the unknown pressure $P_X$ corresponding to $i_{+x}$ in FIG. 5 where the $i_1$ and $i_2$ values of FIG.

5 are selected since these values most closely approximate the measured value of $i_{+x}$ corresponding to the unknown pressure. Thus, it can be seen that the utilization of the collector current $i_+$ to compensate for sensitivity variations may be treated as a special case when it is not desired or necessary to correct for changes in the cathode heating power.

As can be appreciated from the foregoing, interpolation techniques are employed to obtain $S_x$. Alternatively, if the number of data sets of Table 1 is sufficiently large, non-interpolative techniques may be employed. It should also be noted that the curves of FIGS. 5-7 are linear. Although collector current variation and cathode power variation may not be linear over the pressure range of interest, non-linear portions may be approximated by a series of linear portions as is generally known in curve approximation.

Figure 8:
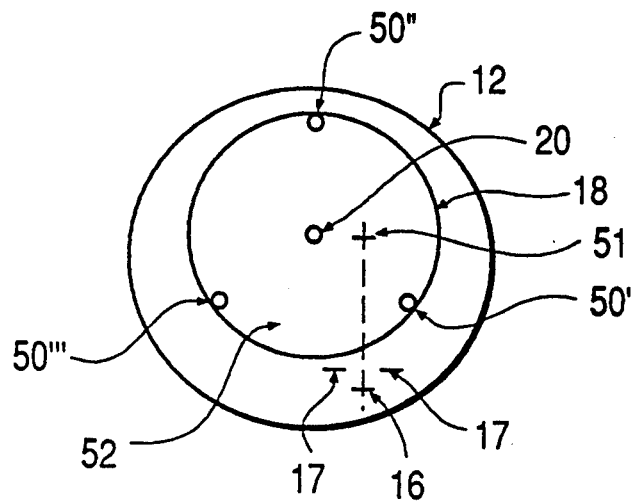
FIG. 8 is a schematic end-on view of the gauges of FIG. 1 or FIG. 2 illustrating a further embodiment of the present invention utilizing a flat offset cathode with electron focusing means.

Referring to FIG. 8, there is shown a metallic shield 12 corresponding to the shield 12 of FIG. 1 (or to the shield 24 of FIG. 2), an offset, axially extending, flat cathode 16, an optional axially extending electron focusing means 17, an axially extending anode 18 in the form of a substantially transparent grid with three support posts 50 extending axially along the anode 18 and an axially extending ion collector electrode 20. Flat cathode 16 is positioned so that the perpendicular to the cathode surface is directed at an imaginary axis 51 which is offset from the axis of the cylindrical anode 18 and the cylindrical ion collector 20. Such a configuration is disclosed in beforementioned U.S. patent application Ser. No. 07/507,579. As also disclosed in the foregoing patent application, flat cathode 16 may be so positioned and so biased that the electrons launched therefrom are initially in substantially parallel paths whereby such focusing thereof will result in substantially all of the emitted electrons following substantially the same trajectories within the anode volume defined by anode 18. Such a flat cathode which is so positioned and biassed is preferred in the present invention.

As also disclosed in the foregoing application and in U.S. Pat. No. 4,636,680, which is incorporated herein by reference and which is assigned to the assignee of the subject application, focusing elements 17 may be optionally employed to effect the above mentioned initially substantially parallel paths of the emitted electrons. For example, if a non-flat cathode is employed or if the flat cathode is not properly positioned and/or biased, it may be desirable to employ focusing elements 17 which in cooperation with the cathode will effect the desired initially substantially parallel paths of the emitted electrons. The focusing elements 17 typically constitute electrodes, which in cooperation with cathode 16, generate electrostatic fields whereby, depending upon the potentials applied to the cathode and focusing elements, the electrons can be emitted in the desired initially substantially parallel paths. The conditions for such focusing can be readily determined utilizing known electromagnetic field theory. In this regard, reference is made to Spangenberg, Vacuum Tubes, McGraw Hill, New York, New York, 1948, Chapter 5, "Determination of Potential Fields". In particular, computer techniques for electron ray tracing, which are well known in the design of electron microscopes, cathode ray tubes, image intensifiers, mass spectrometers, etc. may be utilized. Preferably, as discussed above, the biasing of the focusing elements 17 and cathode 16 is such as to assure that all of the admitted electrons follow substantially the same trajectories through the anode volume defined by anode 18. More particularly, as will be further discussed below, most of the emitted electrons should be made to pass repeatedly through the anode volume before being collected on the anode. Thus, much longer electron path lengths are produced resulting in a much larger number of ions/second being formed at a given pressure.

In view of the foregoing, the term "electron source" as used in the following claims may mean either cathode 16 by itself where the cathode is preferably flat, as discussed above or cathode 16 in combination with focusing means 17.

The support posts 50 are positioned so that the stream of electrons from the cathode 16 does not impinge on a support post 50 as the electron stream enters nor as the electron stream exits the anode volume 52.

Thus, the transparency of the anode is optimized at these areas where the electron stream passes through the anode. Furthermore, axially extending slits (not shown) may be provided in the anode at these areas to further optimize the transparency of the anode thereat. Applicants have found by computer simulation and by actual test that when the support posts 50 are positioned so that a portion of the electron stream impinges on a support post 50 either upon entering or exiting the anode volume 52 that the accuracy of the gauge reading fluctuates uncontrollably with time in a given gauge and from gauge to gauge.

Figure 9:
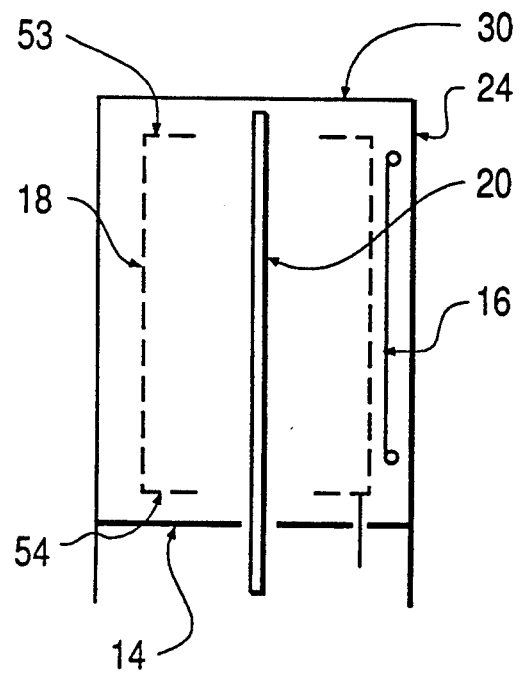
FIG. 9 is a schematic side view of the gauges of FIG. 1 or FIG. 2 illustrating another embodiment of the present invention.
Figure 10A:
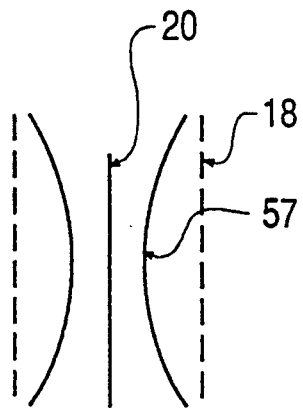
FIGS. 10a-10d are schematic cross-sectional views of different cylindrical electrode structures illustrating the effect on axial field components by different end cap configurations.
Figure 10B:
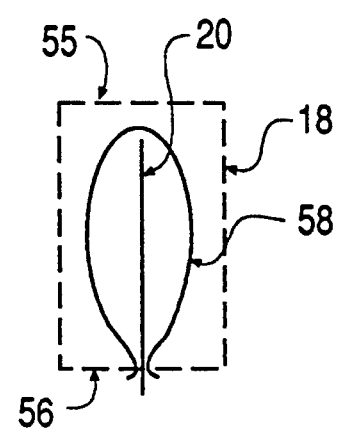
Figure 10C:
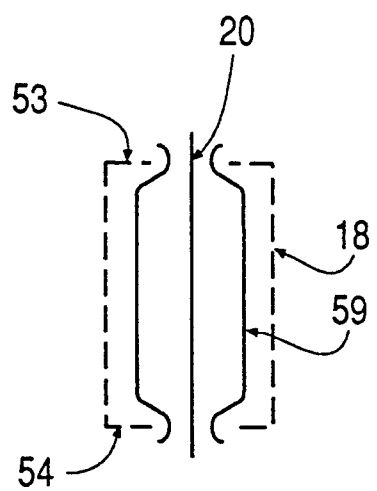
Figure 10D:
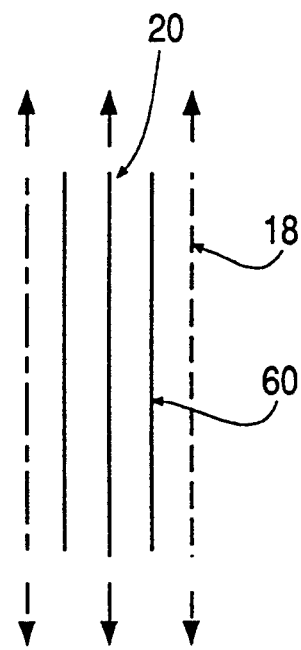

Referring to FIG. 9, there is shown metallic shield 24 (FIG. 2) which may be the vacuum tubulation in which the gauge structure is housed, a metallic shield 30 which is gas permeable, a metallic insulator shield 14 which has openings to permit supports for the cathode 16, the anode 18, and the ion collector 20 to pass through as described hereinbefore.

Partial end caps 53 and 54 are provided to reduce end effects. The ion collector 20 is extended as close as practically possible to the shield 30. The emitting portion of the cathode 16 is approximately centered axially on the anode 18 and extends axially in each direction no further than where the electric field within the anode 18 begins to have a significant axial field component, as discussed below.

Referring to FIG. 10, schematic cross-sectional views of cylindrical electrode structures are shown together with one representative equipotential contour. In FIG. 10a the ends of the anode 18 are open and the equipotential contour 57 is hour glass shaped. In FIG. 10b the end caps 55 and 56 on the anode completely close off the ends of the anode 18 electrically except for a small hole to permit the ion collector to pass through end cap 56. With full end caps 55 and 56 the equipotential contour 58 is barrel shaped. In FIG. 10c an important feature of the present invention is illustrated. Partial end caps 53 and 54 on the anode 18 are provided so that the equipotential contour 59 within the anode 18 tends to have the same radius almost to the ends of the anode 18, thus closely approximating the equipotentials 60 which exist in the infinitely long co-axial cylinders 18 and 20 illustrated in FIG. 10d. Thus, when partial end caps 53 and 54 are provided, a longer cathode can be utilized and still have the electrons injected into the anode volume where significant axial fields are not present.

The features of FIGS. 8-10, together with the features of FIGS. 1-7, function as a whole to provide significantly improved repeatability, measurement to measurement, and reproducibility, gauge to gauge, although it is to be understood the FIG. 8-10 features do not necessarily need to be employed with the features of FIGS. 1–7 to obtain significant improvements. Improvements in accuracy of pressure measurement of the order of tenfold have been repeatedly produced using these new features.

The use of a large diameter ion collector 20 improves the ion collection efficiency as is well-known in the art. However, it has not been appreciated in the prior art that improving the ion collection efficiency and thus decreasing the orbiting ion space charge can help to improve the accuracy of measurement. Applicants have observed that when the orbiting ion space charge is reduced, accuracy is improved. It appears that reducing ion space charge reduces the effect of ion space charge variations on electron trajectories and total electron path length, thus improving accuracy.

Of course, the use of a larger diameter collector results in a larger x-ray current. However, by utilizing a cathode 16 positioned as shown in FIG. 8 and as discussed above, most of the emitted electrons can be made to pass repeatedly through the anode volume before being collected on the anode 18. Thus, much longer electron path lengths are produced resulting in a much larger number of ions/sec being formed at a given pressure than is possible in prior art BA gauges. Note also, as described in copending application Ser. No. 07/507,579, the relative locations of the collector and cathode can be interchanged. That is, the collector 20 may be located on axis 51 while the cathode 16 may be located in line (rather than offset) with respect to the axis of the anode. However, the relative locations illustrated in FIG. 8 are preferred inasmuch as a central location of the collector will promote uniformity of the electron paths.

Thus, the present invention avoids the problem of a higher x-ray limit by causing the collected ion current at a given low pressure to be increased by at least the same amount that the x-ray current is increased due to the larger surface area of the ion collector 20. Accordingly, the ratio of x-ray current to collected ion current and hence the x-ray limit is not increased in the present invention even though the ion collector 20 diameter is at least 400% larger than in prior art BA gauges. It is important to note here that it has been well known in the art that not only the x-ray current but also the collected ion current decreases by use of a smaller diameter ion collector 20 and conversely both the x-ray current and the collected ion current are increased by use of a larger diameter ion collector 20. However, it has not been appreciated that a larger diameter ion collector 20 provides improved accuracy.

Applicants have found that ion collector diameters from about 0.015 in to about 0.080 in. and preferably about 0.020 in. to about 0.060 in. yield improved accuracy without adversely affecting the x-ray limit in the present invention. The use of as long an ion collector 20 as possible also helps to reduce the length of the region where there are significant axial electric field components. Applicants have found that a spacing of about 0.050 in. between the end of the ion collector 20 and the shield 12' produces good results. In any event, the collector should preferably at least extend beyond the end cap 53, as illustrated in FIG. 9.

Axial electric field components within the anode volume tend to cause ions to escape axially and not be collected on the ion collector 20. The escape of, say, 10% to 20% of the ions formed would not in itself be greatly disadvantageous if the fraction escaping remained constant. However, because the electron emission density varies uncontrollably along the length of the cathode 16, as is well-known in the art, the number of ions/sec formed in the end zones of the anode 18 varies uncontrollably with time. Thus, the accuracy of measurement is seriously affected if ions are formed in regions of the anode 18 where there are significant axial electric field components. By utilizing partial end caps 53 and 54, axial electric field components in the anode volume can be significantly reduced except at the very ends of the anode 18. Thus, accuracy of measurement is significantly improved by utilizing partial end caps 53 and 54 where the end caps extend radially inward at least about 25% of the radius of the anode but not more than about 75% of this radius.

Because some axial electric field components necessarily exist at the ends of the anode 18 in BA geometry, it is useful to provide a cathode 16 with an electron emission region which does not emit into the end regions of the anode 18 where there are significant axial electric field components. The regions where significant axial electric field exists in the ends of the anode 18 can be approximately mapped by computer simulation of the electric potential within the anode 20, by electrolytic tank methods or by other methods all of which are well-known in the art. Thus, the use of a hot cathode which does not extend axially beyond the region in the anode 18 where the electric field has negligible axial components helps greatly to improve the accuracy of measurement.

Applicants have observed that the uniformity of transparency of the anode 20 in the regions where the electron stream from the hot cathode 16 passes through the grid which forms the anode 20 is also important to achieve good accuracy. If the transparency of the anode 20 to the passage of electrons varies from point to point, then minor changes in the trajectory of the electrons can seriously affect the fraction of electrons entering or leaving the anode volume. Thus, by providing uniform transparency of the anode insofar as possible, accuracy of measurement is improved, as discussed hereinbefore with respect to support posts 50.

What is claimed is:
1. An ionization gauge comprising:
   an anode defining a cylindrical anode volume and having an axis of substantial symmetry;
   a source of electrons disposed outside said anode volume and extending in a direction substantially parallel to the anode axis for launching the electrons in initially substantially parallel paths such that the emitted electrons follow substantially the same trajectories through the anode volume;
   a collector electrode for collecting ions formed by impact between said electrons and gas molecules within said anode volume so that the pressure of the gas can be measured, said collector electrode having a fixed, proximal end and a free, distal end;
   shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge; and wherein said anode is provided with end caps which extend radially inward at least 25% of the radius of the anode but not more than 75% of the radius;

wherein said collector electrode has a diameter of not less than 0.015 in. and not more than 0.080 in.;

wherein said collector electrode extends at its free end at least through one of said end caps;

wherein the length of said electron source is within a range which is (a) shorter than to (b) not substantially longer than the axial dimension of the region within said anode volume in which the electric field is predominantly directed radially inward, the electron source being located adjacent substantially only to said region; and wherein said anode is provided with a substantially uniformly transparent grid structure in the regions where said electrons enter said anode volume and where said electrons exit said anode volume.

2. A gauge as in claim 1 where the electron source includes a cathode and at least one focusing element.

3. A gauge as in claim 1 where the electron source so focuses the emitted electrons that they pass through the anode volume a plurality of times before they land on the anode.

4. A gauge as in claim 3 where the number of times that the electrons pass through the anode volume is such as to at least offset any tendency for the lower pressure limit of the gauge to be increased due to the size of the ion collector electrode.

5. A gauge as in claim 1 where said collector electrode axially substantially extends along the anode axis.

6. A gauge as in claim 1 where said free end of the ion collector electrode is spaced about 0.050 inch from the shield means.

7. A gauge as in claim 1 where the source of electrons is flat and is directed toward an imaginary axis radially displaced from the anode axis.

8. A gauge as in claim 1 where said anode is provided with axially extending supports which are removed from said regions where the electrons enter and exit the anode volume.

9. An ionization gauge as in claim 1 where the gauge is of the nude type and has insulated electrical feedthroughs for said electron source, anode, and collector electrode and where the shield means includes (a) a longitudinally extending portion, (b) a first end portion which shields a first end of the shielded volume, and (c) a second end portion which shields the other end of the shielded volume from at least said insulated electrical feedthroughs.

10. An ionization gauge as in claim 1 where the gauge is of the non-nude type and has insulated electrical feedthroughs for said electron source, anode, and collector electrode and where the shield means includes a vacuum enclosure, a plasma shield for shielding one end of the shielded volume, and an insulator shield which shields the other end of the shielded volume from at least said insulated electrical feedthroughs.

11. An ionization gauge as in claim 1 wherein the gauge is of the Bayard-Alpert type.

12. An ionization gauge comprising:
an anode defining a cylindrical anode volume and having an axis of substantial symmetry;

a source of electrons disposed outside said anode volume and extending in a direction substantially parallel to the anode axis; and a collector electrode for collecting ions formed by impact between said electrons and gas molecules within said anode volume so that the pressure of the gas can be measured, said collector electrode having a fixed, proximal end and a free, distal end;

wherein said anode is provided with end caps which extend radially inward at least 25% of the radius of the anode but not more than 75% of said radius;

wherein said collector electrode extends at its free end at least through said end caps; and wherein the length of said electron source is within a range which is (a) shorter than to (b) not substantially longer than the axial dimension of the region within said anode volume in which the electric field is predominantly directed radially inward, the electron source being located adjacent substantially only to said region.

13. A gauge as in claim 12 including shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

14. A gauge as in claim 13 where said free end of the ion collector electrode is spaced about 0.050 inch from the shield means.

15. An ionization gauge as in claim 13 where the gauge is of the nude type and has insulated electrical feedthroughs for said electron source, anode, and collector electrode and where the shield means includes (a) a longitudinally extending portion, (b) a first end portion which shields a first end of the shielded volume, and (c) a second end portion which shields the other end of the shielded volume from at least said insulated electrical feedthroughs.

16. An ionization gauge as in claim 13 where the gauge is of the non-nude type and has insulated electrical feedthroughs for said electron source, anode, and collector electrode and where the shield means includes a vacuum enclosure, a plasma shield for shielding one end of the shielded volume, and an insulator shield which shields the other end of the shielded volume from at least said insulated electrical feedthroughs.

17. A gauge as in claim 12 where said collector electrode axially substantially extends along the anode axis.

18. A gauge as in claim 12 where the source of electrons is flat and where the perpendicular to the flat electron source is directed to an imaginary axis radially displaced from the anode axis.

19. A gauge as in claim 12 where the electron source includes means for launching the electrons in initially substantially parallel paths such that the emitted electrons follow substantially the same trajectories through the anode volume.

20. A gauge as in claim 12 where said anode is provided with axially extending supports which are removed from regions where the electrons enter and exit the anode volume.

21. An ionization gauge as in claim 12 wherein the gauge is of the Bayard-Alpert type.

22. An ionization gauge comprising:
an anode defining a cylindrical anode volume and having an axis of substantial symmetry;
a source of electrons disposed outside said anode volume and extending in a direction substantially parallel to the anode axis; and
a collector electrode for collecting ions formed by impact between said electrons and gas molecules within said anode volume so that the pressure of the gas can be measured, said collector electrode having a fixed, proximal end and a free, distal end;
wherein said anode is provided with end caps which extend radially inward at least 25% of the radius of the anode but not more than 75% of said radius; and
wherein said collector extends at its free end at least through one of said end caps.

23. A gauge as in claim 22 including shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

24. A gauge as in claim 23 where said free end of the ion collector electrode is spaced about 0.050 inch from the shield means.

25. An ionization gauge as in claim 23 where the gauge is of the nude type and has insulated electrical feedthroughs for said electron source, anode, and collector electrode and where the shield means includes (a) a longitudinally extending portion, (b) a first end portion which shields a first end of the shielded volume, and (c) a second end portion which shields the other end of the shielded volume from at least said insulated electrical feedthroughs.

26. An ionization gauge as in claim 23 where the gauge is of the non-nude type and has insulated electrical feedthroughs for said electron source, anode, and collector electrode and where the shield means includes a vacuum enclosure, a plasma shield for shielding one end of the shielded volume, and an insulator shield which shields the other end of the shielded volume from at least said insulated electrical feedthroughs.

27. A gauge as in claim 22 where said collector electrode axially substantially extends along the anode axis.

28. A gauge as in claim 22 where the source of electrons is flat and where the perpendicular to the flat electron source is directed to an imaginary axis radially displaced from the anode axis.

29. A gauge as in claim 22 where the electron source includes means for launching the electrons in initially substantially parallel paths such that the emitted electrons follow substantially the same trajectories through the anode volume.

30. An ionization gauge as in claim 22 wherein the gauge is of the Bayard-Alpert type.

31. An ionization gauge comprising:
an anode defining a cylindrical anode volume and having an axis of substantial symmetry;
a source of electrons disposed outside said anode volume and extending in a direction substantially parallel to the anode axis; and
a collector electrode for collecting ions formed by impact between said electrons and gas molecules within said anode volume so that the pressure of the gas can be measured;
wherein said anode is provided with end caps which extend radially inward at least 25% of the radius of the anode but not more than 75% of said radius; and
the length of said electron source is within a range which is (a) shorter than to (b) not substantially longer than the axial dimension of the region within said anode volume in which the electric field is predominantly directed radially inward, the electron source being located adjacent substantially only to said region.

32. A gauge as in claim 31 including shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

33. An ionization gauge as in claim 32 where the gauge is of the nude type and has insulated electrical feedthroughs for said electron source, anode, and collector electrode and where the shield means includes (a) a longitudinally extending portion, (b) a first end portion which shields a first end of the shielded volume, and (c) a second end portion which shields the other end of the shielded volume from at least said insulated electrical feedthroughs.

34. An ionization gauge as in claim 32 where the gauge is of the non-nude type and has insulated electrical feedthroughs for said electron source, anode, and collector electrode and where the shield means includes a vacuum enclosure, a plasma shield for shielding one end of the shielded volume, and an insulator shield which shields the other end of the shielded volume from at least said insulated electrical feedthroughs.

35. A gauge as in claim 31 where the source of electrons is flat and where the perpendicular to the flat electron source is directed to an imaginary axis radially displaced from the anode axis.

36. A gauge as in claim 31 where the electron source includes means for launching the electrons in initially substantially parallel paths such that the emitted electrons follow substantially the same trajectories through the anode volume.

37. A gauge as in claim 31 where said anode is provided with axially extending supports which are removed from regions where the electrons enter and exit the anode volume.

38. An ionization gauge as in claim 31 wherein the gauge is of the Bayard-Alpert type.

39. An ionization gauge comprising:
an anode defining a cylindrical anode volume and having an axis of substantial symmetry;

a source of electrons disposed outside said anode volume and extending in a direction substantially parallel to the anode axis; and a collector electrode for collecting ions formed by impact between said electrons and gas molecules within said anode volume so that the pressure of the gas can be measured;

wherein said anode is provided with end caps which extend radially inward at least 25% of the radius of the anode but not more than 75% of said radius.

40. A gauge as in claim 39 including shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

41. An ionization gauge as in claim 40 where the gauge is of the nude type and has insulated electrical feedthroughs for said electron source, anode, and collector electrode and where the shield means includes (a) a longitudinally extending portion, (b) a first end portion which shields a first end of the shielded volume, and (c) a second end portion which shields the other end of the shielded volume from at least said insulated electrical feedthroughs.

42. An ionization gauge as in claim 40 where the gauge is of the non-nude type and has insulated electrical feedthroughs for said electron source, anode, and collector electrode and where the shield means includes a vacuum enclosure, a plasma shield for shielding one end of the shielded volume, and an insulator shield which shields the other end of the shielded volume from at least said insulated electrical feedthroughs.

43. A gauge as in claim 39 where the source of electrons is flat and where the perpendicular to the flat electron source is directed to an imaginary axis radially displaced from the anode axis.

44. A gauge as in claim 39 where the electron source includes means for launching the electrons in initially substantially parallel paths such that the emitted electrons follow substantially the same trajectories through the anode volume.

45. An ionization gauge as in claim 39 wherein the gauge is of the Bayard-Alpert type.

46. An ionization gauge comprising:
an anode defining a cylindrical anode volume and having an axis of substantial symmetry;
a source of electrons disposed outside said anode volume and extending in a direction substantially parallel to the anode axis; and
a collector electrode for collecting ions formed by impact between said electrons and gas molecules within said anode volume so that the pressure of the gas can be measured;
wherein the length of said electron source is within a range which is (a) shorter than to (b) not substantially longer than the axial dimension of the region within said anode volume in which the electric field is predominantly directed radially inward, the electron source being located adjacent substantially only to said region.

47. A gauge as in claim 46 including shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

48. An ionization gauge as in claim 47 where the gauge is of the nude type and has insulated electrical feedthroughs for said electron source, anode, and collector electrode and where the shield means includes (a) a longitudinally extending portion, (b) a first end portion which shields a first end of the shielded volume, and (c) a second end portion which shields the other end of the shielded volume from at least said insulated electrical feedthroughs.

49. An ionization gauge as in claim 47 where the gauge is of the non-nude type and has insulated electrical feedthroughs for said electron source, anode, and collector electrode and where the shield means includes a vacuum enclosure, a plasma shield for shielding one end of the shielded volume, and an insulator shield which shields the other end of the shielded volume from at least said insulated electrical feedthroughs.

50. A gauge as in claim 46 where the source of electrons is flat and where the perpendicular to the flat electron source is directed to an imaginary axis radially displaced from the anode axis.

51. A gauge as in claim 46 where the electron source includes means for launching the electrons in initially substantially parallel paths such that the emitted electrons follow substantially the same trajectories through the anode volume.

52. A gauge as in claim 46 where said anode is provided with axially extending supports which are removed from regions where the electrons enter and exit the anode volume.

53. An ionization gauge as in claim 46 wherein the gauge is of the Bayard-Alpert type.

54. An ionization gauge comprising:
an anode defining a cylindrical anode volume and having an axis of substantial symmetry;
a source of electrons disposed outside said anode volume and extending in a direction substantially parallel to the anode axis for launching the electrons in initially substantially parallel paths such that the emitted electrons follow substantially the same trajectories through the anode volume; and
a collector electrode for collecting ions formed by impact between said electrons and gas molecules within said anode volume so that the pressure of the gas can be measured;
wherein said collector electrode has a diameter of not less than 0.015 in. and not more than 0.080 in.

55. A gauge as in claim 54 where the electron source includes a cathode and at least one focusing element.

56. A gauge as in claim 54 where the electron source so focuses the emitted electrons that they pass through the anode volume a plurality of times before they land on the anode.

57. A gauge as in claim 56 where the number of times that the electrons pass through the anode volume is such as to at least offset any tendency for the lower pressure limit of the gauge to be increased due to the size of the ion collector electrode.

58. A gauge as in claim 54 where said collector electrode axially substantially extends along the anode axis.

59. A gauge as in claim 54 where said collector electrode has a fixed, proximal end and a free, distal end and where said free end of the collector electrode is spaced about 0.050 inch from a shield means.

60. A gauge as in claim 54 where the source of electrons is flat and is directed toward an imaginary axis radially displaced from the anode axis.

61. A gauge as in claim 54 where said anode is provided with axially extending supports which are removed from regions where the electrons enter and exit the anode volume.

62. A gauge as in claim 54 including shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

63. An ionization gauge as in claim 62 where the gauge is of the nude type and has insulated electrical feedthroughs for said electron source, anode, and collector electrode and where the shield means includes (a) a longitudinally extending portion, (b) a first end portion which shields a first end of the shielded volume, and (c) a second end portion which shields the other end of the shielded volume from at least said insulated electrical feedthroughs.

64. An ionization gauge as in claim 62 where the gauge is of the non-nude type and has insulated electrical feedthroughs for said electron source, anode, and collector electrode and where the shield means includes a vacuum enclosure, a plasma shield for shielding one end of the shielded volume, and an insulator shield which shields the other end of the shielded volume from at least said insulated electrical feedthroughs.

65. An ionization gauge as in claim 54 wherein the gauge is of the Bayard-Alpert type.

66. An ionization gauge comprising:
an anode defining a cylindrical anode volume and having an axis of substantial symmetry;
a source of electrons disposed outside said anode volume and extending in a direction substantially parallel to the anode axis for launching the electrons in initially substantially parallel paths such that the emitted electrons follow substantially the same trajectories through the anode volume;
a collector electrode for collecting ions formed by impact between said electrons and gas molecules within said anode volume so that the pressure of the gas can be measured; and
shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge;
wherein said anode is provided with a substantially uniformly transparent grid structure in the region where said electrons enter said anode volume and where said electrons exit said anode volume.

67. A gauge as in claim 66 where the electron source includes a cathode and at least one focusing element.

68. A gauge as in claim 66 where the electron source so focuses the emitted electrons that they pass through the anode volume a plurality of times before they land on the anode.

69. A gauge as in claim 68 where the number of times that the electrons pass through the anode volume is such as to at least offset any tendency for the lower pressure limit of the gauge to be increased due to the size of the ion collector electrode.

70. A gauge as in claim 66 where the source of electrons is flat and is directed toward an imaginary axis radially displaced from the anode axis.

71. A gauge as in claim 66 where said anode is provided with axially extending supports which are removed from said regions where the electrons enter and exit the anode volume.

72. An ionization gauge as in claim 66 where the gauge is of the nude type and has insulated electrical feedthroughs for said electron source, anode, and collector electrode and where the shield means includes (a) a longitudinally extending portion, (b) a first end portion which shields a first end of the shielded volume, and (c) a second end portion which shields the other end of the shielded volume from at least said insulated electrical feedthroughs.

73. An ionization gauge as in claim 66 where the gauge is of the non-nude type and has insulated electrical feedthroughs for said electron source, anode, and collector electrode and where the shield means includes a vacuum enclosure, a plasma shield for shielding one end of the shielded volume, and an insulator shield which shields the other end of the shielded volume from at least said insulated electrical feedthroughs.

74. An ionization gauge as in claim 66 wherein the gauge is of the Bayard-Alpert type.

75. A method of measuring pressure with an ionization gauge having an anode defining a cylindrical anode volume and having an axis of substantial symmetry, a source of electrons disposed outside said anode volume and extending in a direction substantially parallel to the anode axis for launching the electrons in initially substantially parallel paths such that the emitted electrons follow substantially the same trajectories through the anode volume, and a collector electrode for collecting ions formed by impact between said electrons and gas molecules within said anode volume so that the pressure of the gas can be measured, said collector electrode having a fixed, proximal end and a free, distal end and wherein said collector electrode has a diameter of not less than 0.015 in. and not more than 0.080 in., said method comprising the steps of
providing a shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge;

providing said anode with end caps which extend radially inward at least 25% of the radius of the anode but not more than 75% of said radius;

locating said collector electrode so that its free end extends at least through one of said end caps;

locating said electron source so that it is adjacent substantially only to the region within said anode volume in which the electric field is predominantly directed radially inward, the length of the electron source being within a range which is (a) shorter than to (b) not substantially longer than the axial dimension of said region; and providing said anode with a substantially uniformly transparent grid structure in the regions where said electrons enter said anode volume and where said electrons exit said anode volume.

76. A method as in claim 75 where the electrons emitted from the electron source pass through the anode volume a plurality of times before they land on the anode.

77. A method as in claim 76 where the number of times that the electrons pass through the anode volume is such as to at least offset any tendency for the lower pressure limit of the gauge to be increased due to the size of the ion collector electrode.

78. A method of measuring pressure with an ionization gauge having an anode defining a cylindrical anode volume and having an axis of substantial symmetry, a source of electrons disposed outside said anode volume and extending in a direction substantially parallel to the anode axis, and a collector electrode collecting ions formed by impact between said electrons and gas molecules within said anode volume so that the pressure of the gas can be measured, said collector electrode having a fixed, proximal end and a free, distal end, said method comprising the steps of:

providing said anode with end caps which radially extend radially inward at least 25% of the radius of the anode but not more than 75% of said radius;

locating said collector electrode so that its free end extends at least through said end caps; and locating said electron source so that is it adjacent substantially only to the region within said anode volume in which the electric field is predominantly directed radially inward, the length of the electron source being within a range which is (a) shorter than to (b) not substantially longer than the axial dimension of said region.

79. A method as in claim 78 including providing shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

80. A method of measuring pressure with an ionization gauge having an anode defining a cylindrical anode volume and having an axis of substantial symmetry, a source of electrons disposed outside said anode volume and extending in a direction substantially parallel to the anode axis, and a collector electrode for collecting ions formed by impact between said electrons and gas molecules within said anode volume so that the pressure of the gas can be measured, said collector electrode having a fixed, proximal end and a free, distal end, said method comprising the steps of providing said anode with end caps which extend radially inward at least 25% of the radius of the anode but not more than 75% of said radius; and locating said ion collector so that its free end extends at least through one of said end caps.

81. A method as in claim 80 including providing shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

82. A method of measuring pressure with an ionization gauge having an anode defining a cylindrical anode volume and having an axis of substantial symmetry, a source of electrons disposed outside said anode volume and extending in a direction substantially parallel to the anode axis, and a collector electrode for collecting ions formed by impact between said electrons and gas molecules within said anode volume so that the pressure of the gas can be measured, said method comprising the steps of providing said anode with end caps which extend radially inward at least 25% of the radius of the anode but not more than 75% of said radius; and locating said electron source so that it is adjacent substantially only to the region within said anode volume in which the electric field is predominantly directed radially inward, the length of the electron source being within a range which is (a) shorter than to (b) not substantially longer than the axial dimension of said region.

83. A method as in claim 82 including providing shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

84. A method of measuring pressure with an ionization gauge having an anode defining a cylindrical anode volume and having an axis of substantial symmetry, a source of electrons disposed outside said anode volume and extending in a direction substantially parallel to the anode axis, and a collector electrode for collecting ions formed by impact between said electrons and gas molecules within said anode volume so that the pressure of the gas can be measured, said method comprising providing said anode with end caps which extend radially inward at least 25% of the radius of the anode but not more than 75% of said radius.

85. A method as in claim 84 including providing shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

86. A method of measuring pressure with an ionization gauge having an anode defining a cylindrical anode volume and having an axis of substantial symmetry, a source of electrons disposed outside said anode volume and extending in a direction substantially parallel to the anode axis, and a collector electrode for collecting ions formed by impact between said electrons and gas molecules within said anode volume so that the pressure of the gas can be measured, said method comprising locating said electron source so that it is adjacent substantially only to the region within said anode volume in which the electric field is predominantly directed radially inward, the electron source being within a range which is (a) shorter than to (b) not substantially longer than the axial dimension of said region.

87. A method as in claim 86 including providing shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

88. A method of measuring pressure with an ionization gauge having an anode defining a cylindrical anode volume and having an axis of substantial symmetry, and a source of electrons disposed outside said anode volume and extending in a direction substantially parallel to the anode axis for launching the electrons in initially substantially parallel paths such that the emitted electrons follow substantially the same trajectories through the anode volume, said method comprising providing a collector electrode for collecting ions formed by impact between said electrons and gas molecules within said anode volume so that the pressure of the gas can be measured wherein said ion collector electrode has a diameter of not less than 0.015 in. and not more than 0.080 in.

89. A method as in claim 88 where the electrons emitted by the electron source pass through the anode volume a plurality of times before they land on the anode.

90. A method as in claim 89 where the number of times that the electrons pass through the anode volume is such as to at least offset any tendency for the lower pressure limit of the gauge to be increased due to the size of the ion collector electrode.

91. A method as in claim 88 including providing shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge.

92. A method of measuring pressure with an ionization gauge having an anode defining a cylindrical anode volume and having an axis of substantial symmetry, a source of electrons disposed outside said anode volume and extending in a direction substantially parallel to the anode axis, a collector electrode for collecting ions formed by impact between said electrons and gas molecules within said anode volume so that the pressure of the gas can be measured, said method comprising, providing shield means defining a shielded volume within which said electron source, said anode, and said collector electrode are disposed where the shield means is at least partially open to permit transfer of gas molecules into the shielded volume and to permit external electrical connections to the electron source, the anode, and the collector electrode and where the shield means completely electrically encloses the electron source, the anode and the collector electrode so that potentials external to the shield means do not disturb the electric charge distribution on the electron source, the anode, and the collector electrode to thus stabilize the sensitivity of the gauge;

focusing substantially all of the electrons emitted by the electron source to follow substantially the same trajectories through the anode volume; and providing said anode with a substantially uniformly transparent grid structure in the region where said electrons enter said anode volume and where said electrons exit said anode volume.

93. A method as in claim 92 where the focused electrons pass through the anode volume a plurality of times before they land on the anode.

94. A method as in claim 93 where the number of times that the electrons pass through the anode volume is such as to at least offset any tendency for the lower pressure limit of the gauge to be increased due to the size of the ion collector electrode.

* * * * *